G. SCHMELZLE.
BAKER'S RADIATOR.
APPLICATION FILED JULY 16, 1913.
1,089,678.
Patented Mar. 10, 1914.
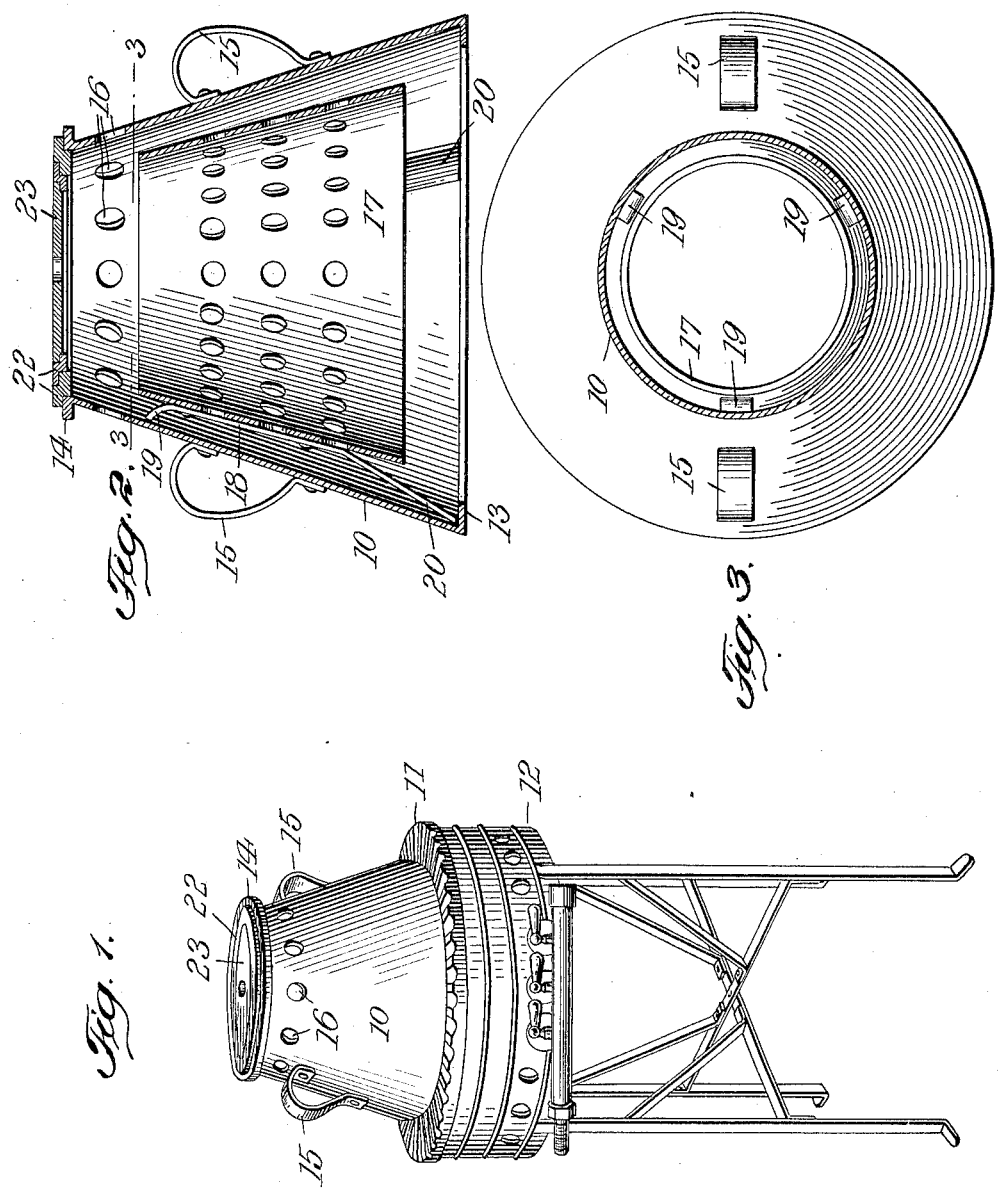
WITNESSES:
INVENTOR
Gustav Schmelzle
BY
ATTORNEYS.

UNITED STATES PATENT OFFICE.

GUSTAV SCHMELZLE, OF BROOKLYN, NEW YORK.

BAKER'S RADIATOR.

1,089,678. Specification of Letters Patent. Patented Mar. 10, 1914.

Application filed July 16, 1913. Serial No. 779,280.

*To all whom it may concern:*

Be it known that I, GUSTAV SCHMELZLE, a citizen of Germany, residing at Brooklyn, county of Kings, and State of New York, have invented a new and Improved Baker's Radiator, of which the following is a specification.

This invention relates to a radiator more particularly adapted to be used in conjunction with a baker's gas stove that is designed for heating grease pots and similar baking utensils. These stoves are frequently idle during extended periods of time, and the object of my invention is to adapt the stoves for warming bake chambers during these periods of idleness. For this purpose I have devised a portable radiator of novel construction which is adapted to be placed upon the stove and which will produce an effective circulation and thorough heating of the air in the bake chamber.

In the accompanying drawings; Figure 1 is a perspective view of my improved radiator, showing it applied to a baker's gas stove; Fig. 2 is a vertical central section of the radiator, and Fig. 3 a horizontal section on line 3, 3, Fig. 2.

The radiator is composed of a truncated coniform shell 10, which is adapted to be placed upon the horizontally disposed grooved burner 11, of a baker's gas stove 12. Shell 10 is provided at its bottom with an inwardly extending flange 13, at its top with an outwardly extending flange 14, and carries a pair of handles 15, while directly below top flange 14 are formed a number of air holes 16 arranged in a circle. Within shell 10 is accommodated a foraminated shield 17 which is also of truncated coniform shape and is spaced from the shell so as to form an intermediate heating flue. This shield is removably centered within the shell by a number of resilient arms 18, riveted to the outer side of the shield and having outwardly deflected upper and lower ends. Of these, the upper ends 19 take a bearing against the inner face of shell 10, below ports 16, while the lower ends 20, project over the bottom flange 13, on which they obtain a foothold. Whenever the shield is burnt out, it may be readily withdrawn from shell 10 by first slightly unbending the lower ends 20 of arm 18 so that the same become disengaged from flange 13. At the top, shell 10 carries a suitable number of pot hole rings 22 sustained by top flange 14, and a pot hole lid 23, to accommodate culinary vessels of various sizes.

It will be seen that by the construction described, the flame will pass upwardly through shield 17, thus extensively heating the same. In this way, the air entrapped between shield 17 and shell 10 will also become heated thereby causing a lively circulation, the cold air entering through the surface grooves of burner 11, while the heated air escapes through ports 16. Thus the stove 12 may be utilized for heating the bakery, while a cooking vessel placed upon rings 22 may also be heated whenever so desired.

I claim:

A radiator of the class described comprising a gas stove having surface grooves, a coniform heat radiating shell adapted to be placed upon said stove and provided with a series of upper apertures, the surface grooves of the stove forming air inlet ducts beneath the shell, a lid supported upon the shell, a perforated coniform shield arranged within the shell, a plurality of resilient arms secured to the shield and having outwardly deflected upper and lower ends that engage the shell whereby an annular heating flue is formed intermediate said shell and shield, and a shield-retaining abutment on the shell that is removably engaged by the lower ends of the resilient arms.

GUSTAV SCHMELZLE.

Witnesses:
ARTHUR E. ZUMPE,
FRIEDA ELMAN.